US006452773B1

(12) United States Patent
Aleksa et al.

(10) Patent No.: US 6,452,773 B1
(45) Date of Patent: Sep. 17, 2002

(54) BROADBAND SHORTED STUB SURGE PROTECTOR

(75) Inventors: Jonas V. Aleksa, Plainfield; James A. Gorecki, Lockport, both of IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/531,398

(22) Filed: Mar. 21, 2000

(51) Int. Cl.[7] .................................................. H02H 1/00
(52) U.S. Cl. ........................................ 361/119; 361/118
(58) Field of Search ................................ 361/117, 118, 361/119; 333/12, 206, 245, 263

(56) References Cited

U.S. PATENT DOCUMENTS

| | | | | |
|---|---|---|---|---|
| 2,774,044 A | * 12/1956 | Silvey et al. | 333/263 |
| 3,391,355 A | * 7/1968 | Felsenheld et al. | 333/263 |
| 3,427,573 A | * 2/1969 | Birdsall et al. | 333/263 |
| 3,886,411 A | 5/1975 | Klayum | 317/62 |
| 4,359,764 A | 11/1982 | Block | 361/119 |
| 4,409,637 A | 10/1983 | Block | 361/119 |
| 4,467,390 A | * 8/1984 | Carpenter, Jr. | 361/119 |
| 4,544,984 A | 10/1985 | Kawanami et al. | 361/119 |
| 4,554,608 A | 11/1985 | Block | 361/119 |
| 4,568,898 A | * 2/1986 | Spinner | 333/263 |
| 4,633,359 A | 12/1986 | Mickelson et al. | 361/119 |
| 5,508,873 A | 4/1996 | Knapp et al. | 361/119 |
| 5,642,249 A | * 6/1997 | Kuznetsov | 361/58 |
| 5,712,755 A | 1/1998 | Glaser et al. | 361/119 |
| 5,724,220 A | 3/1998 | Chaudhry | 361/119 |
| 5,936,822 A | 8/1999 | Bazarian | 361/117 |
| 5,982,602 A | * 11/1999 | Tellas et al. | 361/119 |

FOREIGN PATENT DOCUMENTS

| | | | |
|---|---|---|---|
| CA | 2262124 | 8/1999 | H02H/9/04 |
| CH | 660 261 A5 | 3/1987 | H01T/4/02 |
| WO | WO95/10116 | 4/1995 | H01C/7/10 |
| WO | WO99/19957 | 4/1999 | H02H/3/22 |

* cited by examiner

*Primary Examiner*—Stephen W. Jackson
(74) *Attorney, Agent, or Firm*—Jenkens & Gilchrist

(57) ABSTRACT

A surge protector comprises a coaxial through-section having a first inner conductor, a first outer conductor, and a first dielectric disposed between the first inner conductor and the first outer conductor, and a coaxial shorting stub having a second inner conductor and a second outer conductor. The stub has a first end and a second end. The stub being coupled to the coaxial through-section wherein the second inner conductor is conductively coupled to the first inner conductor at the first end of the stub and the second outer conductor is conductively coupled to the first outer conductor at the first end of the stub. The second inner conductor is substantially hollow. The second inner conductor has at least one helical aperture disposed therein. The at least one helical aperture is continuous for at least about one revolution around the second inner conductor. A shorting plate is conductively coupled to the second inner and second outer conductors at the second end of the stub.

62 Claims, 8 Drawing Sheets

BROADBAND SHORTED STUB SURGE PROTECTOR

FIELD OF THE INVENTION

This invention is directed generally to surge protectors, and, more particularly, relates to a broadband surge protector for use in high frequency communications systems.

BACKGROUND OF THE INVENTION

A surge protector is a device placed in an electrical circuit to prevent the passage of dangerous surges and spikes that could damage electronic equipment. One particularly useful application of surge protectors is in the antenna transmission and receiving systems of wireless communications systems. In such antenna systems, a surge protector is generally connected in line between a main feeder coaxial cable and a jumper coaxial cable. During normal operation of the antenna system, microwave and radio frequency signals pass through the surge protector without interruption. When a dangerous surge occurs in the antenna system, the surge protector prevents passage of the dangerous surge from one coaxial cable to the other coaxial cable by diverting the surge to ground.

One type of surge protector for antenna systems has a tee-shaped configuration including a coaxial through-section and a straight coaxial stub connected perpendicular to a middle portion of the coaxial through-section. One end of the coaxial through-section is adapted to interface with a mating connector at the end of the main feeder coaxial cable, while the other end of the coaxial through-section is adapted to interface with a mating connector at the end of the jumper coaxial cable. Both the coaxial through-section and the straight coaxial stub include inner and outer conductors. At the tee-shaped junction between the coaxial stub and the coaxial through-section, the inner and outer conductors of the coaxial stub are connected to the respective inner and outer conductors of the coaxial through-section. At the other end of the straight coaxial stub, the inner and outer conductors of the coaxial stub are connected together creating a short. The short is indirectly connected to a grounding device, such as a grounded buss bar, by some sort of clamp. The physical length from the junction at one end of the coaxial stub and the short at the other end of the coaxial stub is approximately equal to one-quarter of the center frequency wavelength for a desired narrow band of microwave or radio frequencies.

During normal "non-surge" operation, a surge protector permits signals within the frequency band to pass through the surge protector between the two cables connected thereto, in either direction. The direction of signal travel depends upon whether the surge protector is used on the transmission side or receiving side of an antenna system. Signals within the desired band of operating frequencies pass through one of the interfaces (depending on the direction of signal travel) to the surge protector. When passing through the surge protector, signals within the desired frequency band travel through the coaxial through-section of the surge protector. A portion of the desired signal, however, encounters the stub while passing through the coaxial through-section. The stub scatters this signal portion which causes this signal portion to travel down the stub. After reflecting off the short, the scattered signal portion returns along the stub. Because the physical length of the stub from the junction with the inner conductor of the coaxial through-section to the short is designed to be equal to one-quarter of the center frequency wavelength for the desired band of operating frequencies, the scattered signal portion adds in phase to the non-scattered signal portion and passes through to the other end of the coaxial through-section.

When a surge occurs in the antenna system (e.g. from a lightning strike), the physical length of the stub is much shorter than one-quarter of the center frequency wavelength because the surge is at a much lower frequency than the desired band of operating frequencies. In this situation, the surge travels along the inner conductor of the coaxial through-section to the stub, through the stub to the short, through the short to the grounding attachment, and through the grounding attachment to a grounding device attached thereto. Thus, the surge is diverted to ground by the surge protector.

A drawback of the above tee-shaped surge protectors is that these surge protectors have a limited operating bandwidth. Original equipment manufacturers ("OEM") and wireless service providers are currently required to purchase a multitude of shorted stub surge protectors to address all of the various applications that operate at different frequencies. Since there is an increasing preference towards shorted stub surge protectors because of their multiple strike capabilities and superior passive intermodulation distortion performance, an OEM or service provider would have to stock and inventory a multitude of different shorted stub surge protectors for the common allocated operating bandwidths of today's systems (800–870 MHz, 824–896 MHz, 870–960 MHz, 1425–1535 MHz, 1700–1900 MHz, 1850–1990 MHz, 2110–2170 MHz, 2300–2485 MHz, etc.). A broadband shorted stub surge protector that can operate over this entire frequency range would allow an OEM or service provider to carry one product; obviously, simplifying inventory requirements and offering the cost advantages leveraged in higher volume purchases.

Additionally, there is a significant need for a broadband surge protector because there is an increasing amount of pressure from society to limit the number of cell sites associated with wireless communications systems. Towards this end, there is an increasing need for wireless service providers to co-locate their operating systems employing diplexing and triplexing techniques via the existing coaxial transmission lines. This trend of multiplexing various operating frequencies has made it essential for all traditional narrowband components, such as surge protectors, to be upgraded to broadband devices.

While other types of broadband surge protectors are available being manufactured today, many employ a technique of installing a gas discharge tube between the inner and outer conductors of the coaxial surge device. While these types of devices offer broadband performance, they suffer from several undesirable features including the need for regular scheduled maintenance, the inability to withstand multiple strikes, and poor passive intermodulation distortion performance.

Accordingly, there exists a need for a surge protector which has a broad operating bandwidth for use in wireless communications systems.

SUMMARY OF THE INVENTION

An object of the present invention is to provide a surge protector which has a broad operating bandwidth for use in wireless communications systems.

In one embodiment, the foregoing object is realized by providing a surge protector comprising a coaxial through-section having a first inner conductor, a first outer conductor, and a first dielectric disposed between the first inner and first outer conductors, and a coaxial shorting stub having a second inner conductor and a second outer conductor. The stub has a first end and a second end. The stub is coupled to the coaxial through-section wherein the second inner conductor is conductively coupled to the first inner conductor at the first end of the stub and the second outer conductor is conductively coupled to the first outer conductor at the first end of the stub. The second inner conductor is substantially hollow and has at least one helical aperture disposed therein. The at least one helical aperture is continuous for at least about one revolution around the second inner conductor. A shorting plate is conductively coupled to the second inner and second outer conductors at the second end of the stub.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other objects and advantages of the invention will become apparent upon reading the following detailed description in conjunction with the drawings in which.

DETAILED DESCRIPTION OF THE PREFERRED EMBODIMENTS

Figure 1:
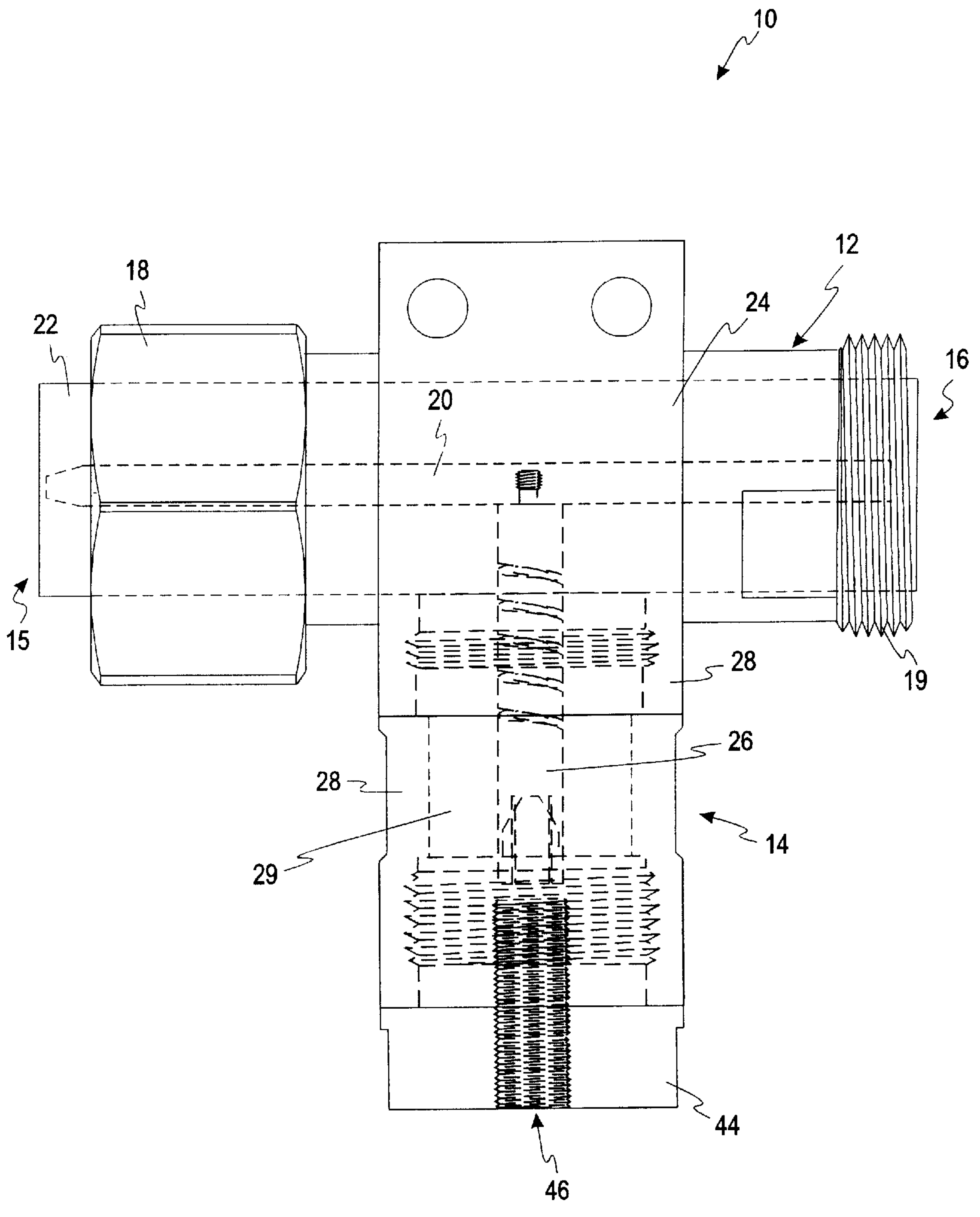
FIG. 1 is a side view of a broadband surge protector according to one embodiment of the present invention.
Figure 2:
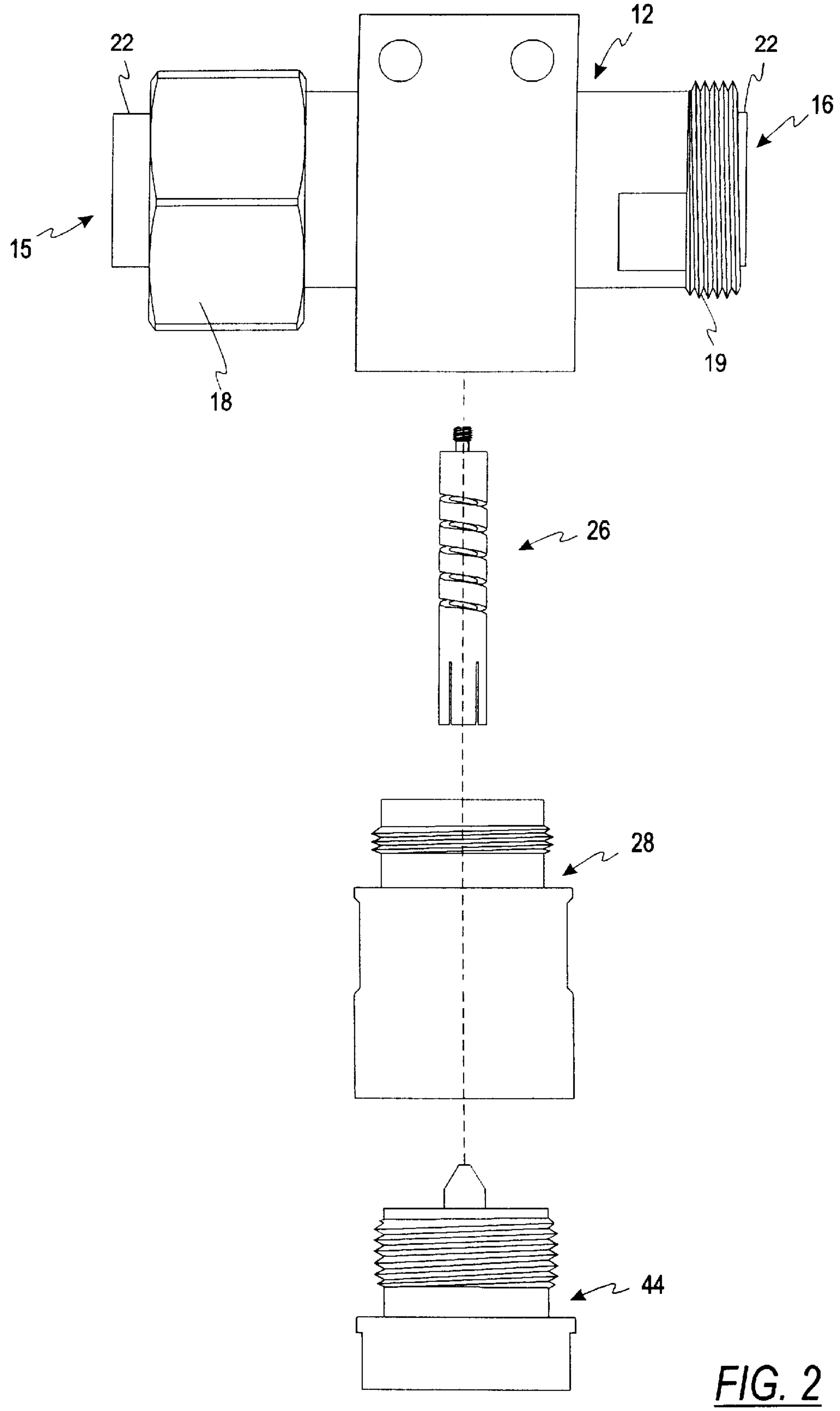
FIG. 2 is an exploded view of a broadband surge protector according to one embodiment of the present invention.

Referring now to the drawings, FIGS. 1 and 2 illustrate a broadband shorted stub surge protector 10 for use in high frequency wireless communications systems. The surge protector 10 has a coaxial through-section 12 and a straight coaxial shorting stub 14 disposed substantially perpendicular to the coaxial through-section 12. A first end 15 and a second end 16 are coupled to a first coaxial cable and second coaxial cable (not shown), respectively, in a high frequency wireless communication system. The shorting stub is coupled to a grounding device (not shown). A radiating coaxial cable is one type of coaxial cable which is used in high frequency wireless systems which may be used in conjunction with the present invention. Commonly-owned U.S. Pat. No. 5,809,429 entitled "Radiating Coaxial Cable and Communication System Using Same" discloses one such coaxial cable and is incorporated herein by reference in its entirety.

Figure 3:
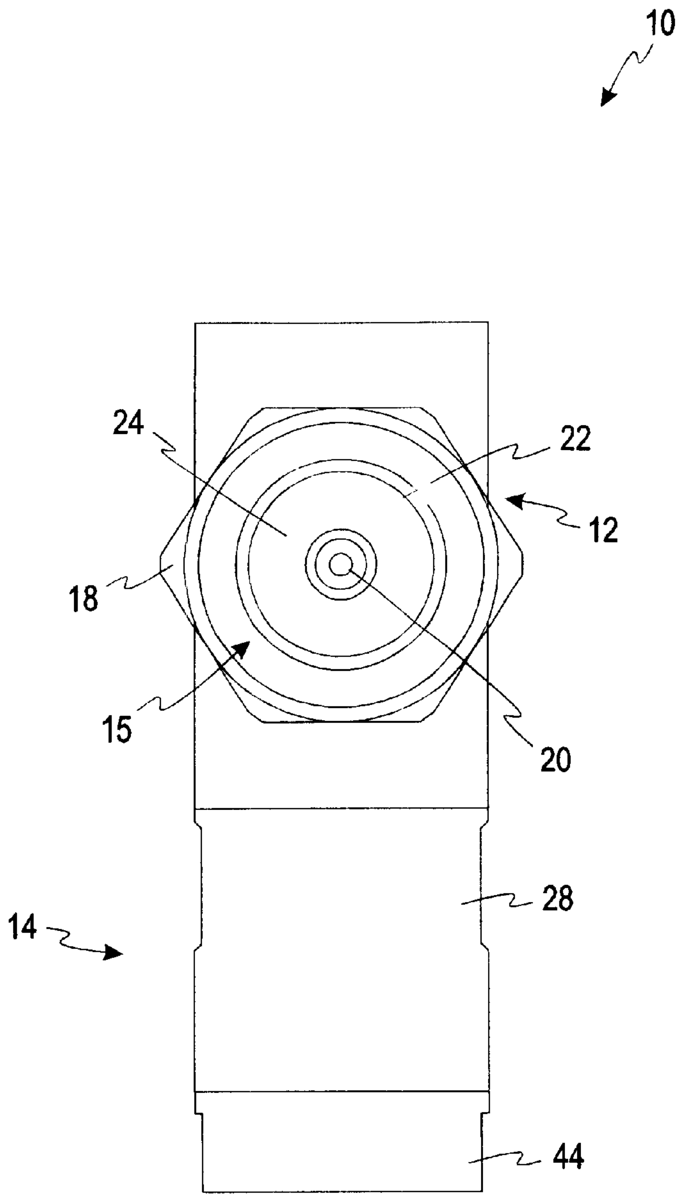
FIG. 3 is a side view of a broadband surge protector according to one embodiment of the present invention.
Figure 4:
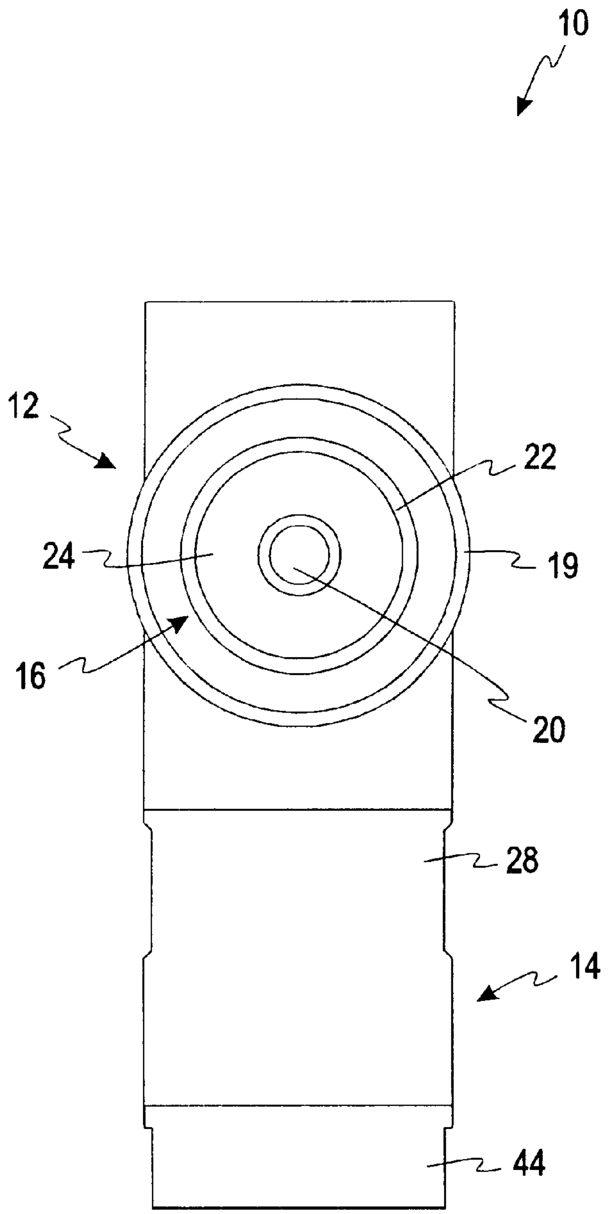
FIG. 4 is another side view of a broadband surge protector according to one embodiment of the present invention.
Figure 5:
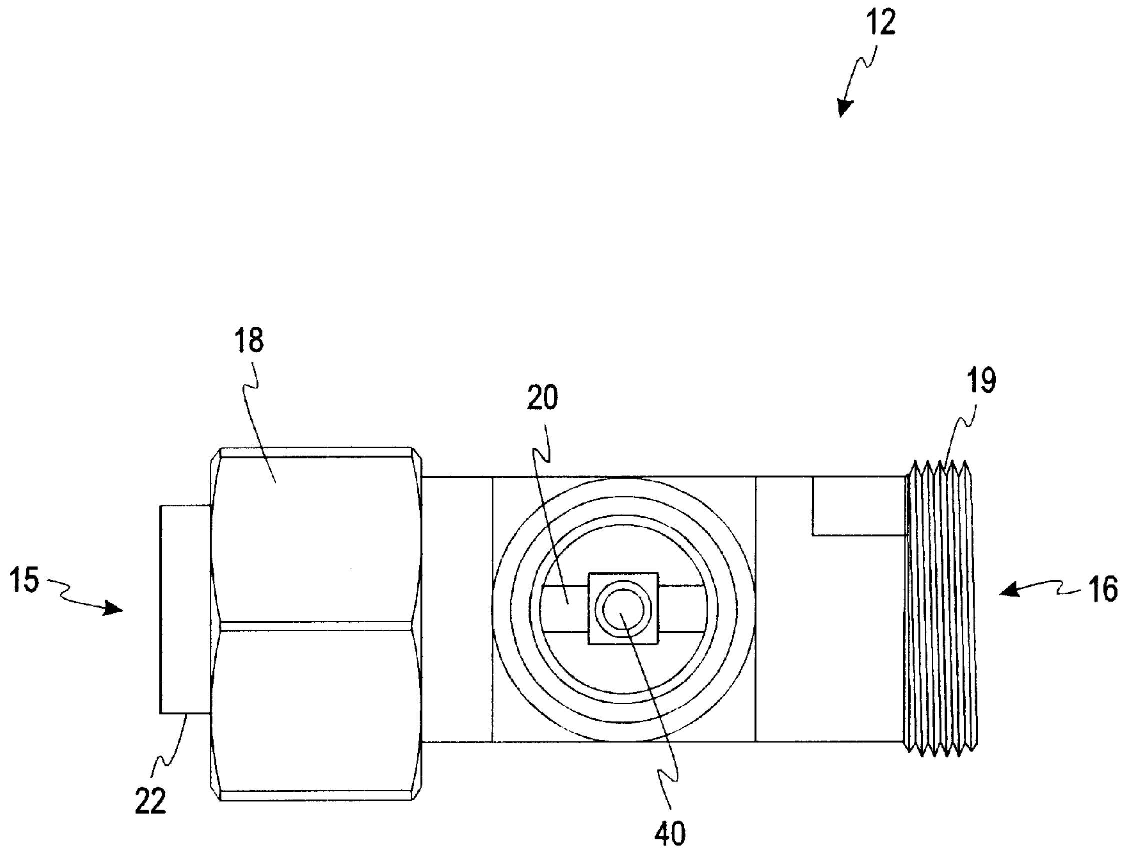
FIG. 5 is a bottom view of a coaxial through-section of a broadband surge protector according to one embodiment of the present invention.

Referring also to FIGS. 3, 4, 5, the broadband surge protector 10 has a suitable first connector 18 and a second connector 19 disposed at the first and second ends 15,16, respectively, for coupling the surge protector 10 to the first and second cables in the system. Further details of suitable connectors which may be used in conjunction with the surge protector 10 illustrated in FIGS. 1 and 2 are disclosed in commonly-owned U.S. Pat. No. 5,892,602 entitled "Surge Protector Connector" and U.S. Pat. No. 4,046,451 entitled "Connector for Coaxial Cable with Annularly Corrugated Outer Conductor," both of which are incorporated herein by reference in their entirety.

The coaxial through-section 12 has an inner conductor 20 insulated from an outer conductor 22 by a dielectric material 24. The inner conductor 20 defines the longitudinal axis of the coaxial through-section. The straight coaxial stub 14 contains an inner conductor 26 and an outer conductor 28. The inner and outer conductors 20,22 of the coaxial through-section 12 are conductively connected to the inner and outer conductors 26,28 of the stub 14, respectively. In an alternative embodiment of the present, the stub 14 contains a dielectric disposed in the space 29 between the inner and outer conductors 26,28.

Figure 6:
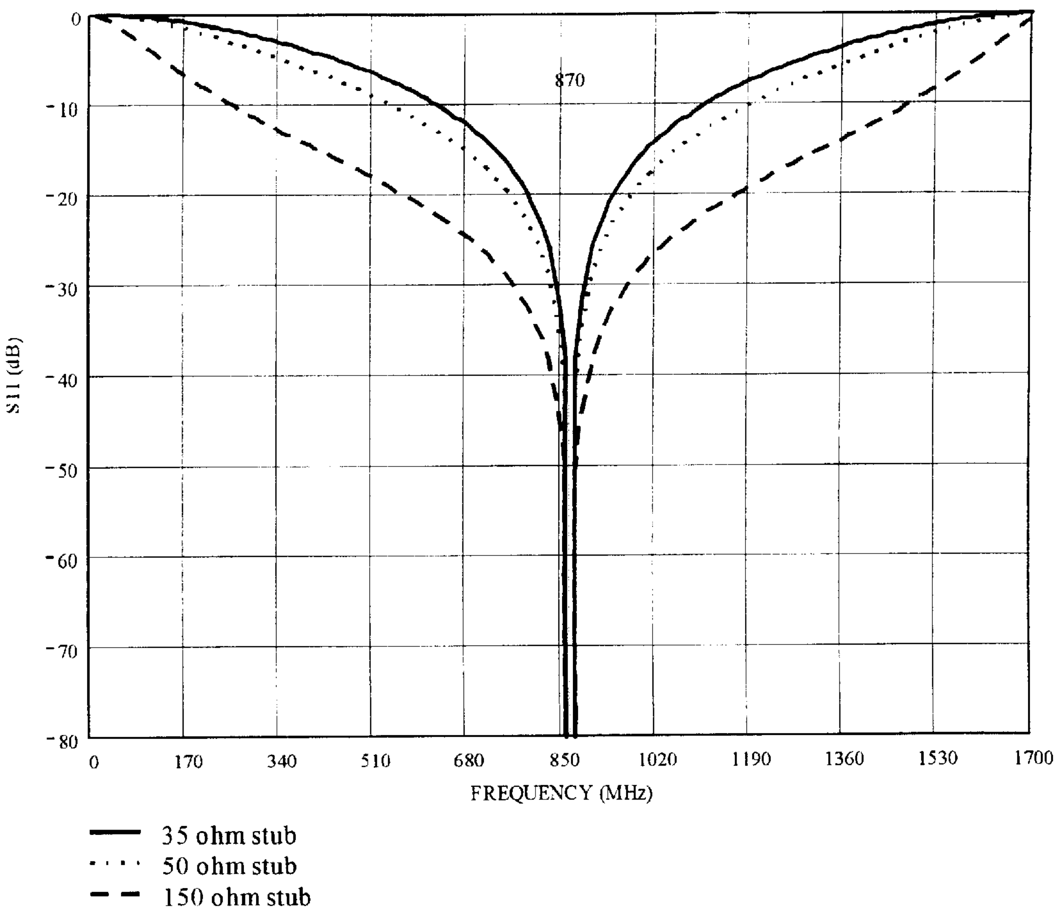
FIG. 6 is a plot of the frequency bandwidth of three prior-art traditional shorted stub surge protectors, each having a different stub impedance.

One of the aforementioned drawbacks of the traditional tee-shaped quarter wave shorted stub surge protectors ("traditional QWS") is that these surge protectors have a limited operating bandwidth. However, in high frequency wireless communications systems, for example, the microwave and/or radio signals have frequencies ranging from approximately 800 MHz to 2500 MHz. As many as ten traditional QWS may be required to cover this frequency range. The bandwidth of a traditional QWS can be increased by increasing the impedance of the shorting stub. For example, a traditional QWS designed for a center resonant frequency of 870 MHz has a theoretical 20 dB return loss bandwidth of 155 MHz when the stub impedance is 35 ohms. The same traditional QWS with a resonant center frequency of 870 MHz has a theoretical 20 dB return loss bandwidth of 226 MHz when the impedance is 50 ohms. Continuing, the same traditional QWS with a resonant center frequency of 870 MHz will have a theoretical 20 dB return loss bandwidth of 580 MHz when the impedance is 150 ohms. This effect of increasing the stub impedance of a traditional QWS is illustrated in FIG. 6.

Increasing the impedance of the stub of a traditional QWS provides a broader bandwidth. A higher stub impedance can be achieved by either decreasing the diameter of the inner conductor of the stub or increasing the diameter of the outer conductor of the stub. However, both of these methods have significant consequences. Decreasing the diameter of the shorting stub compromises the current carrying capability of the stub. This is analogous to the fusing concept of a metallic conductor. Therefore, there is a strict limitation and performance trade-off associated with decreasing the stub center conductor diameter. Increasing the diameter of the outer conductor of the stub results in a larger sized surge protector which translates into an increased cost of the device. This also is an undesirable solution.

The effectiveness of a surge protector is characterized by the throughput energy which is a measure of the amount of energy which passes through to the output of the surge protector when the input of the surge protector is subjected to a surge (e.g. a lightning transient waveform). Commonly in industry, a lightning transient waveform is modeled as a current waveform consisting of an eight microsecond rise time (from 10% to 90% peak value) and a twenty microsecond decay time (down to 50% peak value) with an amplitude level that may vary from 2000 amperes peak current to as much as 20,000 amperes peak current. The specific amplitude depends on where the surge protector is installed as well as the anticipated exposure levels of transient activity. The throughput energy can be calculated by applying the input current surge, recording the residual output voltage waveform, and integrating the square of this residual voltage waveform over the duration of the surge event. Dividing this value by the load impedance will provide a numerical value (expressed in Joules) for the throughput energy. The residual voltage waveform is proportional to the inductance of the stub, is proportional to the change in current during the rise time, and is inversely proportional to the rise time of the applied current waveform. The inductance of the stub can be manipulated to reduce throughput energy. For a traditional QWS, the self-inductance of the stub can be approximated by the following expression.

$$L_{inductance}\ (\mu\text{H}) = \frac{0.508}{10^2}\left[\left(2.303\cdot\log\left(\frac{2\cdot\text{Length}}{\text{Width}+\text{Thickness}}\right)+0.5+0.2235\frac{(\text{Width}+\text{Thickness})}{\text{Length}}\right)\right]$$

Where Length, Thickness, and Width represent the length, thickness, and width of the stub. As can be seen from the above expression, reducing the length of the stub results in a reduction in inductance which translates into a reduction in throughput energy. Accordingly, it is desirable to reduce the length of the stub to reduce the throughput energy of the surge protector. The stub length can be reduced by adding a dielectric material to increase the effective dielectric constant between the inner and outer conductors of the stub. However, reducing the effective stub length in this manner also has the undesirable effect of lowering the impedance of the stub which narrows the operating bandwidth of the surge protector.

The present inventors have found that adding a very small amount of series inductance to a shorting stub can result in a unique broad banding effect to increase the frequency operating range of the surge protector. However, because the addition of series inductance to the shorting stub results in a compromise in throughput energy performance, it is preferable to reduce the overall length of the stub to maintain lower throughput energy values. Because it is difficult to add series inductance in a concentrated fashion, the reduction in overall length can be achieved by distributing the inductance over the length of the shorting stub. The inductance can be selectively distributed over a significant portion of the stub by making the shorting stub's inner conductor hollow and machining a small helical aperture through the outer wall of the inner conductor. In other words, the inner conductor of the shorting stub is in the form of a hollow cylinder having a helical aperture formed therein.

Figures 7A, 7B:
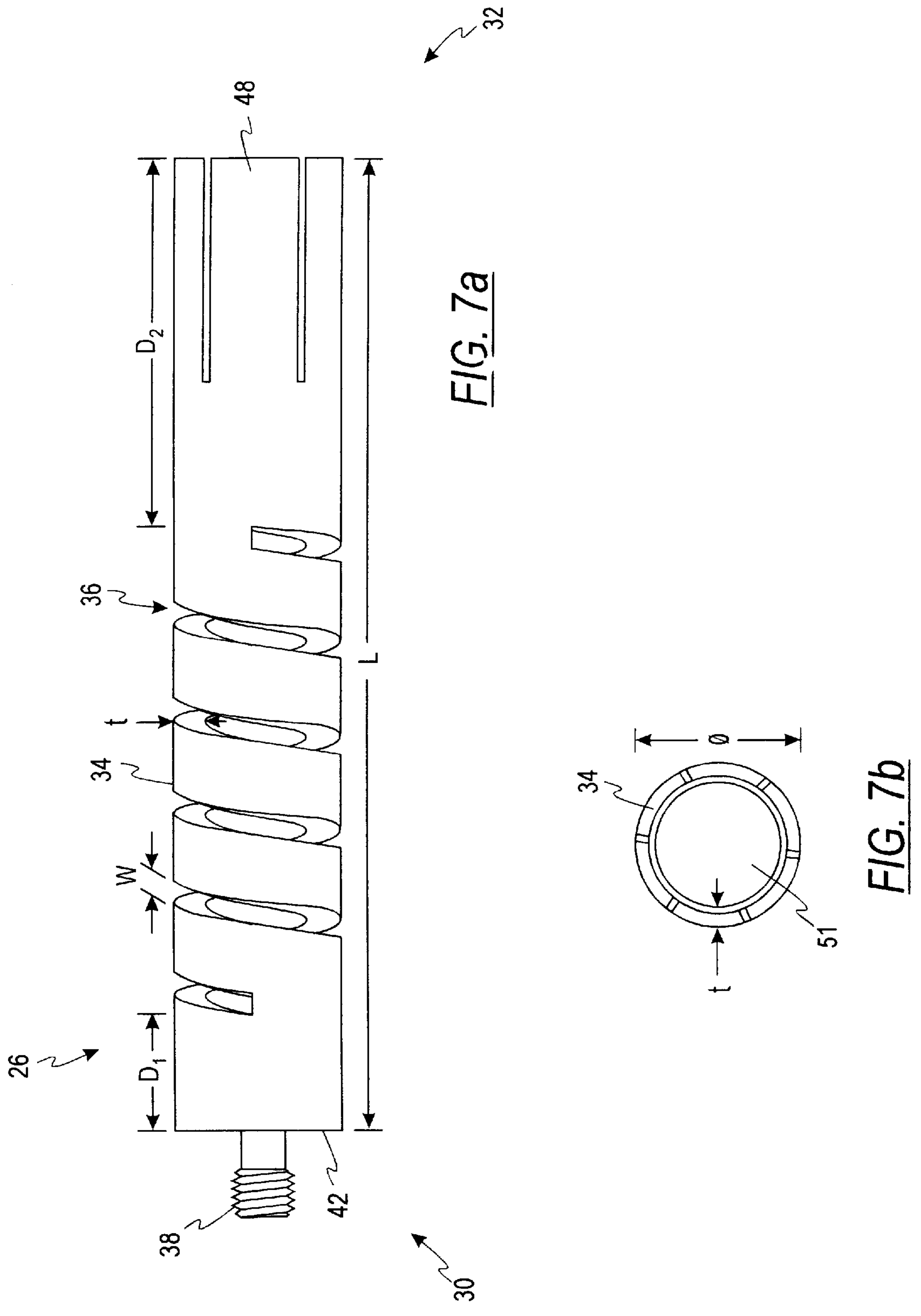
FIG. 7*a* is a side view of an inner conductor of a broadband surge protector according to one embodiment of the present inventions.
FIG. 7*b* is a bottom view of an inner conductor of a broadband surge protector according to one embodiment of the present inventions.

The result is the broadband surge protector 10 (FIGS. 1 and 2) and the corresponding inner conductor 26 illustrated in FIGS. 7*a* and 7*b*. Referring now to FIGS. 7*a* and 7*b*, the illustrated embodiment of the inner conductor 26 of the stub 14 has an input end 30 and an output end 32. The input end 30 of the stub 14 is coupled to the inner conductor 20 of the coaxial through-section. The inner conductor 26 is hollow from substantially the input end through the output end. The inner conductor 26 has an outer diameter ϕ of approximately 0.270 inch. The outer wall 34 of the hollow inner conductor 26 has a thickness t of approximately 0.070 inch. The inner conductor 26 has a length L of approximately 1.221 inches.

The hollow inner conductor 26 has an aperture 36 continuously helically disposed within its outer wall 34. The helical aperture 36 begins at a distance $D_1$ of 0.110 inch from the input end of the inner conductor and terminates at a distance $D_2$ of approximately 0.500 inch from the output end 32 of the inner conductor 36. The continuous helical aperture 36 has a width W of approximately 0.030 inch and makes about five revolutions around the inner conductor 26. The helical aperture 36 is designed to maintain a cross-sectional area capable of carrying of at least twenty kiloamperes surge current without degradation, fusing, or arcing. The helical aperture 36 can be machined in an efficient manner using modern computer numerically controlled machining centers. The dimensions of the stub 14 allow the surge protector 10 to be interchangeable with many surge protectors currently being used in high frequency wireless communications systems.

The input end 30 of the inner conductor 26 includes an integral externally threaded member 38 for coupling the inner conductor 26 of the stub 14 to the inner conductor 20 of the coaxial through-section 12. The inner conductor 20 of the coaxial through-section 12 contains a corresponding tapped aperture 40 (FIG. 5). The inner conductor 26 is hollow from substantially the input end 30 through the output end 32. At the input end 30, the inner conductor is not hollow for a small length providing a base 42 for the externally threaded member 38.

Referring back to FIGS. 1 and 2, a shorting plate 44 is conductively coupled to the inner conductor 26 and the outer conductor 28 at the output end 32 of the stub 14 in order to create a short to short out a surge. The inner conductor 26 of the shorting stub 14 contains a spring-finger socket 48 at its output end 32 (FIG. 7*a*). The shorting plate 44 includes a corresponding protruding spring-finger 50 to couple the shorting plate 44 to the inner conductor 26 of the stub 14. To ground the surge passing through the stub 14, the shorting plate 44 is provided with a grounding attachment 46 for coupling the shorting plate 44 to ground. In the illustrated embodiment, the grounding attachment 46 is an internally threaded aperture to couple the shorting plate to a grounding device having a corresponding threaded member.

Figure 8:
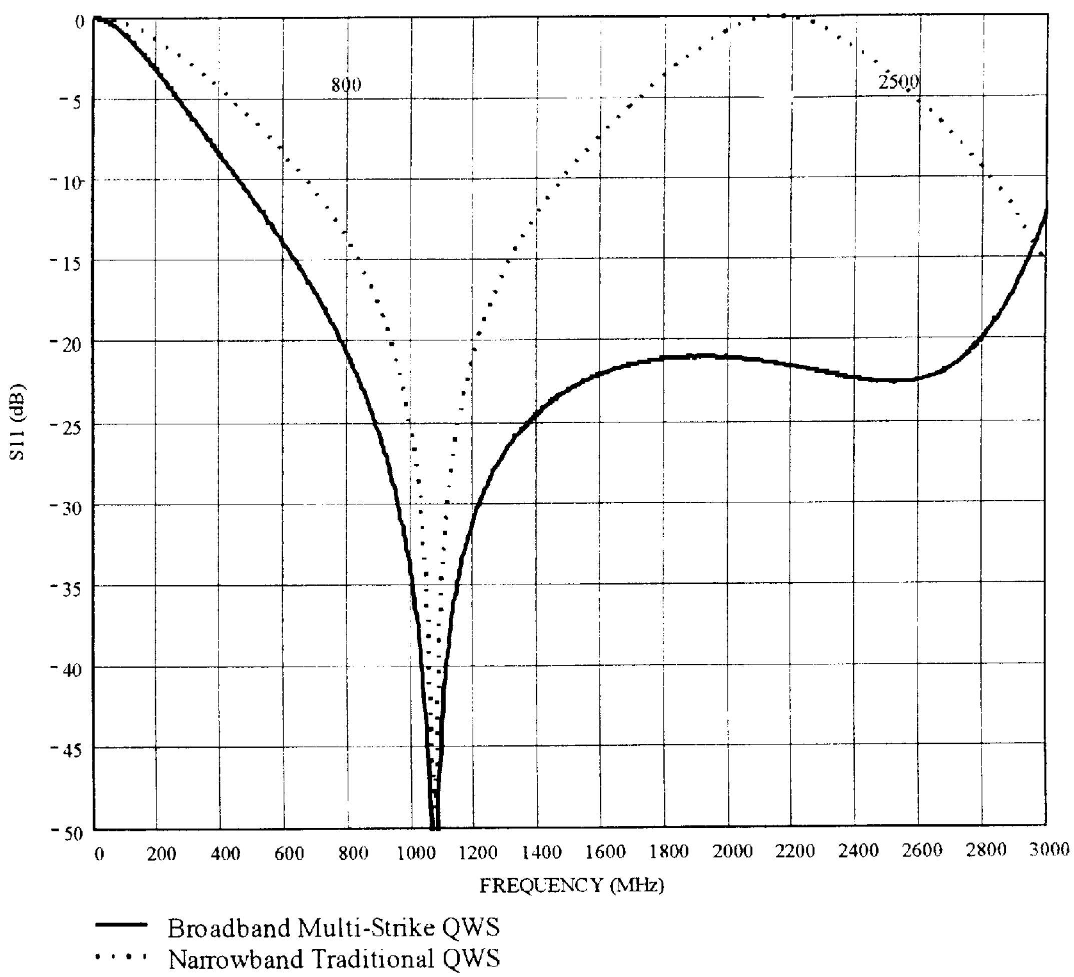
FIG. 8 is a plot comparing the bandwidth of a prior-art traditional shorted stub surge protector compared to a broadband surge protector according to one embodiment of the present invention.

Referring now to FIG. 8, the performance of the broadband surge protector 14 of the present invention is compared to a traditional QWS. The helical distributed inductive effect of the surge protector 14 results in broadband radio frequency performance providing 20 dB return loss and 0.06 dB insertion loss over the 800 MHz to 2500 MHz frequency range. At frequencies below 800 MHz the broadband surge protector 14 performs similarly to the traditional QWS because the inductive reactance is a function of frequency and at lower frequencies it has little effect. However, at higher frequencies, it is apparent that the surge protector 14 of the present invention is able to operate with a wide bandwidth. In a traditional QWS it was often necessary to implement the use of tuning insulators, a dielectric disposed in the space 29 between the inner conductor and the outer conductor 28, to lower the impedance of the shorting stub for narrowing or fine-tuning the bandwidth. However, because the broadband surge protector 10 operates over such a large bandwidth the need for tuning insulators is obviated. Eliminating tuning insulators also results in a substantial cost savings, a reduction of constituent parts, and higher manufacturing yields. In an alternative embodiment, a dielectric material can be placed within the hollow interior 51 (FIG. 7*b*) to adjust the operating frequency bandwidth of the surge protector 10.

In addition to being able to operate over a wide range of frequencies, the broadband surge protector 10 was tested and found to have excellent surge protection capabilities (e.g. a low throughput energy). A lightning transient waveform modeled as a current waveform consisting of an eight microsecond rise time and a twenty microsecond decay time with a peak current of two thousand amperes was applied to the broadband surge protector 10. The resulting throughput energy was less than 25 micro-Joules ($25\times10^{-6}$ Joules). The broadband surge protector also achieved exceptional performance in other regards. For example, in one embodiment of the present invention, the broadband surge protector 10 achieved broadband insertion loss performance of less than 0.1 dB over the most commonly used frequency ranges of 800 MHz to 2500 MHz. In another embodiment, the broadband surge protector 10 achieved broadband return loss performance better than 20 dB over the most commonly used frequency ranges of 800 MHz to 2500 MHz. In yet another embodiment, the broadband surge protector 10 was found to be cable of operating at least an average power of 2000 watts when operating anywhere in the frequency range of approximately 800 to 2500 MHz. In yet another embodiment, the broadband surge protector 10 achieved exceptional passive intermodulation performance of levels of −160 dBc (−120 dBm) with two twenty watt carriers applied to the surge protector 10.

The broadband surge protector 10 of the present invention possesses multi-strike capabilities. Because the surge protector is constructed such that all surge current carry conductors are made of solid metal material there is no conductor degradation from repeated surges which is a problem associated with other prior art surge protectors that use gas tubes, metal oxide varistors, or silicon avalanche diodes to carry surge current. One embodiment of the broadband surge protector 10 is able to withstand at least one hundred directly applied surges to the inner conductor of the surge protector at a level of twenty kilo-amperes without any physical or electrical degradation. Similarly, the surge protector 10 is constructed such that it is not polarized; therefore, the device can be installed in either orientation without compromising any electrical, mechanical, or environmental performance.

The broadband surge protector 10 is constructed to withstand severe environmental and mechanical conditions. For example, in one embodiment of the present invention, the broadband surge protector 10 is constructed to withstand at least twenty-four hours of one meter water immersion without any moisture ingress or performance degradation. In an alternative embodiment, the broadband surge protector 10 is constructed to withstand twenty-four hours of vibration testing in three planes with applied vibrations sweeping from 10 to 2000 Hz at a peak level of 5 G without any performance degradation or fatiguing. In another alternative embodiment, the broadband surge protector 10 is constructed to withstand mechanical shock testing of a 30 G amplitude, three cycles in all three planes, without any performance degradation or fatiguing. In yet another alternative embodiment, the broadband surge protector 10 is constructed to withstand at least a thousand hours of corrosion testing (salt fog) without any performance degradation. In yet another alternative embodiment, the broadband surge protector 10 is constructed to withstand at least twenty-five severe thermal cycles (+85 C for one hour, −55 C for one hour) without any performance degradation or fatiguing. In yet another alternative embodiment, the broadband surge protector 10 is constructed to withstand at least ten days of humidity testing at 95% humidity and a temperature of 65 C without any performance degradation.

In an alternative embodiment of the present invention, a capacitor (not shown) is electrically coupled in series to the coaxial-through-section 12 to aid in reducing the throughput energy resulting from a surge flowing through the surge protector. In some extraordinary circumstances, the operating system requiring protection may be extremely sensitive to transients and therefore require even a lower level of throughput energy performance. In such rare extreme applications, a series capacitor used in conjunction with the helical aperture shorted stub surge protector 10 of the present invention can provide an additional level of surge protection and further reduce the throughput energy. Further, in another alternative embodiment, a series inductor coupled in series to the coaxial through-section 12 and terminating to a separate connecting interface may be implemented to permit the introduction of low level DC current (through the separate connecting interface) into the transmission line system for power requirements of transmission equipment. Only the connector 18,19 coupled to the inductor would carry current. The series capacitor would effectively decouple the second coaxial connector 18,19 of the coaxial through-section from the DC current.

The illustrated embodiments of the surge protector 10 shows that the helical aperture 36 is continuous for about five revolutions around the inner conductor 26 of the stub 14. However, in alternative embodiments of the present invention, the helical aperture 36 need only make at least one revolution around the inner conductor 26. In an alternative embodiment of the surge protector 10, where the aperture 36 is continuous about the inner conductor 26 for about two and a half revolutions the distance $D_1$ is 0.300 inch and the distance $D_2$ is 0.580. In such an alternative embodiment, the helical aperture is located such that high performance levels of return loss can be achieved at even a higher frequency range. For systems demanding even a higher level of performance regarding return loss, a inner conductor 26 having a helical aperture 36 continuous for about two and a half revolutions can be implemented to achieve about 30 dB return loss from 1500 MHz to 3400 MHz. In other alternative embodiments, the helical aperture 36 extends for at least approximately one-fifth of a length L of the inner conductor. In still other alternative embodiments of the present invention, the helical aperture ranges from extending for about one-forth to about three-fourths of the length L of the inner conductor. In still other alternative embodiments of the present invention, the inner conductor 26 of the stub 14 may contain more than one helical aperture or, alternatively still, the helical aperture may be segmented into more than one section.

The inner conductor length L and outer diameter $\phi$ can vary according to alternative embodiments of the present invention. For example the ratio of the outer diameter $\phi$ to the length L of the inner conductor 26 can range anywhere from about 0.10 to about 0.40. The thickness t of the wall of the inner conductor 26 can range between 0.050 inch to about 0.090 inch according to other embodiments of the present invention. The practical limitations of the manufacturing process and the current handling capabilities of the inner conductor material are some of the parameters which determine the boundaries of this range. The material in out of which the inner conductor 26 is constructed can also be varied according to other alternative embodiments of the present invention. For example, in alternative embodiments of the present invention, the inner conductor 26 is constructed out of phosphor bronze alloy 544 full hard material, beryllium copper B196 Alloy C, or brass ASTM B16 half hard, or any non-ferromagnetic material that would be suitable to carry a microwave signal and capable of carrying current.

In alternative embodiments, the present invention may be applied to surge protectors other than the illustrated tee-shaped surge protectors. For example, the curvilinear stub of the surge protector disclosed in commonly-owned U.S. Pat. No. 5,892,602 entitled "Surge Protector Connector," incorporated herein by reference above, may be made hollow and have a helical aperture disposed therein to increase the operating bandwidth of that surge protector. In other alternative embodiments, the hollow inner conductor 26 having a helical aperture 36 disposed therein can be applied to other surge protector as well. For example, a hollow inner conductor 26 having a helical aperture 36 disposed therein can be implemented in a surge protector having a right-angle through-section geometry. In such an embodiment, the coaxial through-section incorporates a 90° bend at some point (generally at a mid-point) in the coaxial-through section. The inner conductor 26 of the stub 14 would be connected to the 90° coaxial-through section at the first end 30 of the inner conductor 26 and be conductively coupled to the outer conductor 28 of the stub 14 creating a short.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A surge protector, comprising:

a coaxial through-section having a first inner conductor, a first outer conductor, and a first dielectric disposed between the first inner conductor and the first outer conductor;

a coaxial shorting stub having a second inner conductor and a second outer conductor, the coaxial shorting stub having a first end and a second end, the coaxial shorting stub being coupled to the coaxial through-section wherein the second inner conductor is conductively coupled to the first inner conductor at the first end of the stub and the second outer conductor is conductively coupled to the first outer conductor at the first end of the stub, the second inner conductor being substantially hollow and having at least one helical aperture continuously disposed therein for at least one revolution around the second inner conductor; and a shorting plate conductively coupled to the second inner conductor and the second outer conductor at the second end of the stub.

2. The surge protector of claim 1 wherein the coaxial through-section is generally cylindrical in shape.

3. The surge protector of claim 2 wherein the coaxial through-section has a first and a second end, the surge protector further comprising:

a first connector coupled to the first end of the coaxial through-section, the first connector being adapted to electrically couple the first end of the coaxial through-section to a first coaxial cable; and a second connector coupled to the second end of the coaxial through-section, the second connector being adapted to electrically couple the second end of the coaxial through-section to a second coaxial cable.

4. The surge protector of claim 1 wherein the second inner conductor is made of a non-ferromagnetic material.

5. The surge protector of claim 4 wherein the material is a phosphor bronze alloy.

6. The surge protector of claim 4 wherein the material is a beryllium copper alloy.

7. The surge protector of claim 4 wherein the material is brass.

8. The surge protector of claim 1 wherein the second inner conductor has a length about equal to one-quarter of a center frequency wavelength for a band of operating frequencies.

9. The surge protector of claim 1 wherein the second inner conductor has a length of about 1.221 inches.

10. The surge protector of claim 1 wherein the second inner conductor has an outer diameter of about 0.270 inch.

11. The surge protector of claim 1 wherein the second inner conductor has an interior diameter of about 0.140 inch.

12. The surge protector of claim 1 wherein the helical aperture is continuous for about 2.5 revolutions around the second inner conductor.

13. The surge protector of claim 12 wherein the second inner conductor has a first end and a second end and wherein the helical aperture has a first end and a second end, the first end of the helical aperture being disposed about 0.300 inch from the first end of the second inner conductor, the second end of the helical aperture being disposed about 0.580 inch from the second end of the second inner conductor.

14. The surge protector of claim 1 wherein the helical aperture is continuous for about 5 revolutions around the second inner conductor.

15. The surge protector of claim 14 wherein the second inner conductor has a first end and a second end and wherein the helical aperture has a first end and a second end, the first end of the helical aperture being disposed about 0.110 inch from the first end of the second inner conductor, the second end of the helical aperture being disposed about 0.500 from the second end of the second inner conductor.

16. The surge protector of claim 14 wherein the helical aperture has a width of about 0.030 inch.

17. The surge protector of claim 14 wherein the helical aperture has a pitch of about 0.118 inch.

18. The surge protector of claim 1 further comprising a second dielectric disposed within the stub between the second inner conductor and the second outer conductor.

19. The surge protector of claim 1 further comprising a capacitor electrically coupled to the coaxial through-section in series.

20. The surge protector of claim 1 wherein the second end of the shorting stub has coupling mechanism attached thereto being adapted to couple the shorting plate to ground.

21. The surge protector of claim 20 wherein the coupling mechanism is a spring-finger socket.

22. The surge protector of claim 1 wherein the first inner conductor contains an internally threaded aperture disposed therein and the second inner conductor includes an externally threaded member being adapted to couple the stub to the internally threaded aperture of the first inner conductor.

23. The surge protector of claim 1 wherein the second inner conductor is generally cylindrical in shape and the shorting stub comprises a dielectric disposed in the second inner conductor.

24. A surge protector, comprising:

a coaxial through-section having a first inner conductor, a first outer conductor, and a first dielectric disposed between the first inner conductor and the first outer conductor, the coaxial-through section having a first end and a second end;

a first connector coupled to the first end of the coaxial through-section, the first connector being adapted to electrically couple the first end of the coaxial through-section to a first coaxial cable;

a second connector coupled to the second end of the coaxial through-section, the second connector being adapted to electrically couple the second end of the coaxial through-section to a second coaxial cable;

a coaxial shorting stub having a second inner conductor, a second outer conductor, and a second dielectric disposed between the second inner conductor and the second outer conductor, the coaxial shorting stub having a first end and a second end, the stub being coupled to the coaxial through-section wherein the second inner conductor is conductively coupled to the first inner conductor at the first end of the stub and the second outer conductor is conductively coupled to the first outer conductor at the first end of the stub, the second inner conductor being substantially hollow, the second inner conductor having a helical aperture continuously disposed therein for at least about 2.5 revolutions around the second inner conductor; and a shorting plate conductively coupled to the second inner conductor and the second outer conductor at the second end of the stub.

25. The surge protector of claim 24 wherein the coaxial through-section is generally cylindrical in shape.

26. The surge protector of claim 24 wherein the second inner conductor is made of a non-ferromagnetic material.

27. The surge protector of claim 24 wherein the material is a phosphor bronze alloy.

28. The surge protector of claim 24 wherein the material is a beryllium copper alloy.

29. The surge protector of claim 24 wherein the material is brass.

30. The surge protector of claim 24 wherein the second inner conductor has a length about equal to one-quarter of a center frequency wavelength for a band of operating frequencies.

31. The surge protector of claim 24 wherein the second inner conductor has a length of about 1.221 inches.

32. The surge protector of claim 24 wherein the second inner conductor has an outer diameter of about 0.270 inch.

33. The surge protector of claim 24 wherein the second inner conductor has an interior diameter of about 0.200 inch.

34. The surge protector of claim 24 wherein the second inner conductor has a first end and a second end and wherein the helical aperture has a first end and a second end, the first end of the helical aperture being disposed about 0.300 inch from the first end of the second inner conductor, the second end of the helical aperture being disposed about 0.580 inch from the second end of the second inner conductor.

35. The surge protector of claim 24 wherein the helical aperture is continuous for about 5 revolutions.

36. The surge protector of claim 35 wherein the second inner conductor has a first end and a second end and wherein the helical aperture has a first end and a second end, the first end of the helical aperture being disposed about 0.110 inch from the first end of the second inner conductor, the second end of the helical aperture being disposed about 0.500 from the second end of the second inner conductor.

37. The surge protector of claim 35 wherein the helical aperture has a width of about 0.030 inch.

38. The surge protector of claim 35 wherein the helical aperture has a pitch of about 0.118 inch.

39. The surge protector of claim 24 further comprising a capacitor electrically coupled to the coaxial through-section in series.

40. The surge protector of claim 24 wherein the second end of the shorting stub has coupling mechanism attached thereto being adapted to couple the shorting plate to ground.

41. The surge protector of claim 40 wherein the coupling mechanism is a spring-finger socket.

42. The surge protector of claim 24 wherein the first inner conductor contains an internally threaded aperture disposed therein and the second inner conductor includes an externally threaded member being adapted to couple the stub to the internally threaded aperture of the first inner conductor.

43. The surge protector of claim 24 wherein the second inner conductor is generally cylindrical in shape and the shorting stub comprises a dielectric disposed in the second inner conductor.

44. A surge protector, comprising:

a coaxial through-section having a first inner conductor and a first outer conductor; and a coaxial shorting stub having a second inner conductor and a second outer conductor, the stub having a first end and a second end, the second inner conductor being conductively coupled to the first inner conductor at the first end of the stub, the second outer conductor being conductively coupled to the first outer conductor at the first end of the stub, the second inner conductor and the second outer conductor being conductively coupled to each other at the second end of the stub, the second inner conductor being substantially hollow and having a helical aperture continuously disposed therein for at least one revolution around the second inner conductor.

45. The surge protector of claim 44, wherein the second inner conductor includes a generally cylindrical outer wall, said helical aperture being formed in the outer wall.

46. The surge protector of claim 45, wherein a ratio of a diameter of the generally cylindrical outer wall to a length of the second inner conductor is at least 0.10.

47. The surge protector of claim 46, wherein the ratio ranges from about 0.11 to about 0.33.

48. The surge protector of claim 47, wherein the ratio is about 0.22.

49. The surge protector of claim 45, wherein the helical aperture extends at least partially between the first and second ends of the stub.

50. The surge protector of claim 49, wherein the helical aperture extends for at least one-fifth of a length of the second inner conductor.

51. The surge protector of claim 50, wherein the helical aperture ranges from extending for about one-fourth of a length of the inner conductor to about three-fourths of a length of the inner conductor.

52. The surge protector of claim 51, wherein the helical aperture extends for about one-half a length of the inner conductor.

53. A method of manufacturing a surge protector, comprising:

providing a coaxial through-section having a first inner conductor and a first outer conductor;

providing a coaxial shorting stub having a second inner conductor and a second outer conductor, the stub having a first end and a second end, the second inner conductor being conductively coupled to the first inner conductor at the first end of the stub, the second outer conductor being conductively coupled to the first outer conductor at the first end of the stub, the second inner conductor and the second outer conductor being conductively coupled to each other at the second end of the stub, the second inner conductor being substantially hollow and having a generally cylindrical outer wall; and cutting a helical aperture in the generally cylindrical outer wall of the second inner conductor, wherein the helical aperture is continuous for at least one revolution around the second inner conductor.

54. The method of claim 53 wherein cutting the helical aperture is accomplished with a computer numerically controlled milling machine.

55. The method of claim 53 wherein providing a coaxial shorting stub further comprises providing a second inner conductor having a ratio of an outer diameter of the second inner conductor to a length of the second inner conductor of at least 0.10.

56. The method of claim 55 wherein the ratio ranges from about 0.11 to about 0.33.

57. The method of claim 56 wherein the ratio is about 0.22.

58. The method of claim 54 wherein cutting the helical aperture further comprises cutting a helical aperture in the generally cylindrical outer wall of the second inner conductor between the first and second ends of the stub.

59. The method of claim 53 wherein the helical aperture extends for at least one-fifth of a length of a second inner conductor.

60. The method of claim 59 wherein the helical aperture ranges from extending for about one-forth of a length of the inner conductor to about three-fourths of a length of the inner conductor.

61. The method of claim 60 wherein the helical aperture extends for about one-half a length of the inner conductor.

62. A surge protector for use in a communication system having operating frequencies at or above about 800 MHz, the protector comprising:

a coaxial through-section coupled with the communication system to allow transmissions at the operating frequencies to pass through the system; and a coaxial shorting stub coupled with the coaxial through-section to facilitate protecting the system from surges at frequencies below the operating frequencies of the system, wherein the shorting stub comprises an inner conductor comprising at least one helical aperture disposed therein for at least one revolution about the inner conductor.

* * * * *